United States Patent
Calciu et al.

(10) Patent No.: US 12,008,361 B2
(45) Date of Patent: Jun. 11, 2024

(54) COHERENCE-BASED DYNAMIC CODE REWRITING, TRACING AND CODE COVERAGE

(71) Applicant: VMware, Inc., Palo Alto, CA (US)

(72) Inventors: Irina Calciu, Palo Alto, CA (US); Andreas Nowatzyk, San Jose, CA (US); Pratap Subrahmanyam, Saratoga, CA (US)

(73) Assignee: VMware LLC, Palo Alto, CA (US)

( * ) Notice: Subject to any disclaimer, the term of this patent is extended or adjusted under 35 U.S.C. 154(b) by 258 days.

(21) Appl. No.: 17/531,582

(22) Filed: Nov. 19, 2021

(65) Prior Publication Data

US 2023/0028825 A1    Jan. 26, 2023

Related U.S. Application Data

(60) Provisional application No. 63/225,099, filed on Jul. 23, 2021.

(51) Int. Cl.
| | | |
|---|---|---|
| *G06F 9/44* | (2018.01) | |
| *G06F 8/656* | (2018.01) | |
| *G06F 9/30* | (2018.01) | |
| *G06F 9/38* | (2018.01) | |
| *G06F 9/455* | (2018.01) | |
| *G06F 13/16* | (2006.01) | |

(52) U.S. Cl.
CPC .......... *G06F 8/656* (2018.02); *G06F 9/30047* (2013.01); *G06F 9/3804* (2013.01); *G06F 9/45533* (2013.01); *G06F 13/1668* (2013.01)

(58) Field of Classification Search
None
See application file for complete search history.

(56) References Cited

U.S. PATENT DOCUMENTS

| | | |
|---|---|---|
| 10,761,984 B2 | 9/2020 | Calciu et al. |
| 10,929,295 B2 | 2/2021 | Gandhi et al. |
| 11,068,400 B2 | 7/2021 | Kolli et al. |
| 11,099,991 B2 | 8/2021 | Kolli et al. |
| 11,126,464 B2 | 9/2021 | Calciu et al. |
| 2008/0046661 A1* | 2/2008 | Saha ............... G06F 9/3834 711/144 |

(Continued)

OTHER PUBLICATIONS

Thomas Kittel et al., "Code Validation for Modern OS Kernels", 2014 (Year: 2014).*

(Continued)

*Primary Examiner* — Wei Y Zhen
*Assistant Examiner* — Lanny N Ung
(74) *Attorney, Agent, or Firm* — Kim & Stewart LLP

(57) ABSTRACT

A device tracks accesses to pages of code executed by processors and modifies a portion of the code without terminating the execution of the code. The device is connected to the processors via a coherence interconnect and a local memory of the device stores the code pages. As a result, any requests to access cache lines of the code pages made by the processors will be placed on the coherence interconnect, and the device is able to track any cache-line accesses of the code pages by monitoring the coherence interconnect. In response to a request to read a cache line having a particular address, a modified code portion is returned in place of the code portion stored in the code pages.

20 Claims, 5 Drawing Sheets

(56) References Cited

U.S. PATENT DOCUMENTS

| | | | |
|---|---|---|---|
| 2011/0320785 A1* | 12/2011 | Chen | G06F 9/3806 |
| | | | 712/E9.035 |
| 2018/0143903 A1* | 5/2018 | Wu | G06F 12/121 |
| 2020/0034175 A1 | 1/2020 | Calciu et al. | |
| 2020/0034176 A1 | 1/2020 | Calciu et al. | |
| 2020/0034297 A1* | 1/2020 | Calciu | G06F 12/0817 |
| 2020/0104119 A1* | 4/2020 | Nyshadham | G06F 9/321 |

OTHER PUBLICATIONS

Tran et al. "A Hardware-Assisted Tool for Fast, Full Code Coverage Analysis," 2008 19th International Symposium on Software Reliability Engineering (ISSRE), 2008, pp. 321-322.

* cited by examiner

COHERENCE-BASED DYNAMIC CODE REWRITING, TRACING AND CODE COVERAGE

CROSS-REFERENCE TO RELATED APPLICATIONS

This application claims the benefit of U.S. Provisional Application No. 63/225,099, filed Jul. 23, 2021, which is incorporated by reference herein.

BACKGROUND

A variety of different tools are available for system administrators to keep their systems up and running while performing code analysis and protecting them against malware attacks. Live patching is one such tool and it has become popular because it can be used to update a running system, e.g., to patch security vulnerabilities, without terminating its execution. In virtualized computer systems, live patching may be employed to modify kernel code running in a virtual machine on the fly to communicate various states of the virtual machine to the hypervisor running in the host machine. In addition, live patching may be employed to inject code into a running system for purposes of tracing.

In addition, code profiling tools are employed to measure the effectiveness of a running system. One example of a code profiling tool measures code coverage, which is a useful metric for many applications. A high code coverage is an indicator of a well-written and testable code. The metric also provides information on any code execution paths that are missed and can help in dead code detection and elimination.

SUMMARY

One or more embodiments provide a device that tracks accesses to pages of code, e.g., kernel code of an operating system, executed by processors and modifies a portion of the code without terminating the execution of the code. The device is connected to the processors via a coherence interconnect and a local memory of the device stores the code pages. As a result, any requests to access cache lines of the code pages made by the processors will be placed on the coherence interconnect, and the device is able to track any cache-line accesses of the code pages by monitoring the coherence interconnect. In response to a request to read a cache line having a particular address, a modified code portion, e.g., one that executes a trampoline, is returned in place of the code portion stored in the code pages.

A method of modifying a portion of code that is stored in code pages while the code is being executed in a processor, according to an embodiment, includes: prior to execution of the code by the processor, storing the code pages in a local memory of a device that is connected to the processor via a coherence interconnect; and during execution of the code by the processor, monitoring the coherence interconnect for requests to access cache lines of the code pages, and in response to a request to read a cache line of the code pages having a particular address, returning first contents in place of second contents of the cache line stored in the code pages.

Further embodiments include a non-transitory computer-readable storage medium comprising instructions that cause a computer system to carry out the above method, as well as a computer system configured to carry out the above method.

DETAILED DESCRIPTION

Figure 1A:
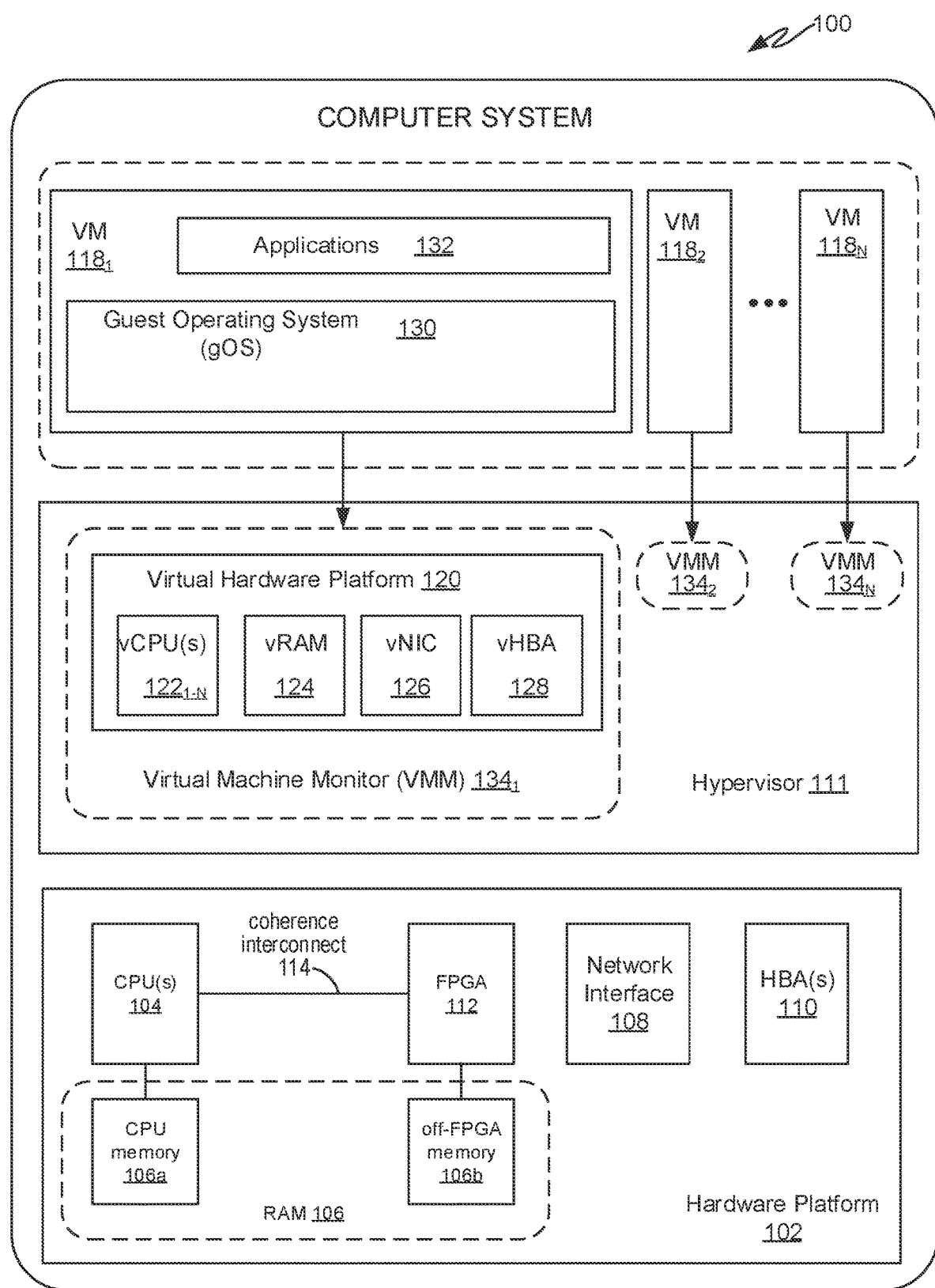
FIG. 1A depicts a block diagram of a computer system that is representative of a virtualized computer architecture in which embodiments may be implemented.

FIG. 1A is a block diagram of a computer system that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware including central processing units (CPUs) 104, random access memory (RAM) 106 as system memory, one or more network interfaces 108 for connecting to a network, and one or more host bus adapters (HBA) 110 for connecting to a storage system. In addition, hardware platform 102 includes a field-programmable gate array (FPGA) 112, which is installed in a CPU socket and communicates with one or more CPUs 104 via coherence interconnect 114. Coherence interconnect 114 may be any point-to-point coherence interconnect between processors, such as the Intel® UltraPath Interconnect (UPI), which is a successor to the Intel® QuickPath Interconnect (QPI), which supports a cache coherence protocol. In another embodiment, coherence interconnect 114 is a Compute Express Link™ (CXL™) operating with CXL.Cache and/or CXL.Mem protocols. Though the following description has the FPGA occupying a CPU socket, the embodiments are not so limited; any arrangement of the FPGA that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, CA. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual hardware platform that is executed under the control of hypervisor 111, in particular the corresponding VMM $134_1$-$134_N$. For example, virtual hardware devices of VM $118_1$ in virtual hardware platform 120 include one or more virtual CPUs (vCPUs) $122_1$-$122_N$, a virtual random access memory (vRAM) 124, a virtual network interface adapter (vNIC) 126, and virtual HBA (vHBA) 128. Virtual hardware platform 120 supports the installation of a guest operating system (guest OS) 130, on top of which applications 132 are executed in VM $118_1$. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine.

Figure 1B:
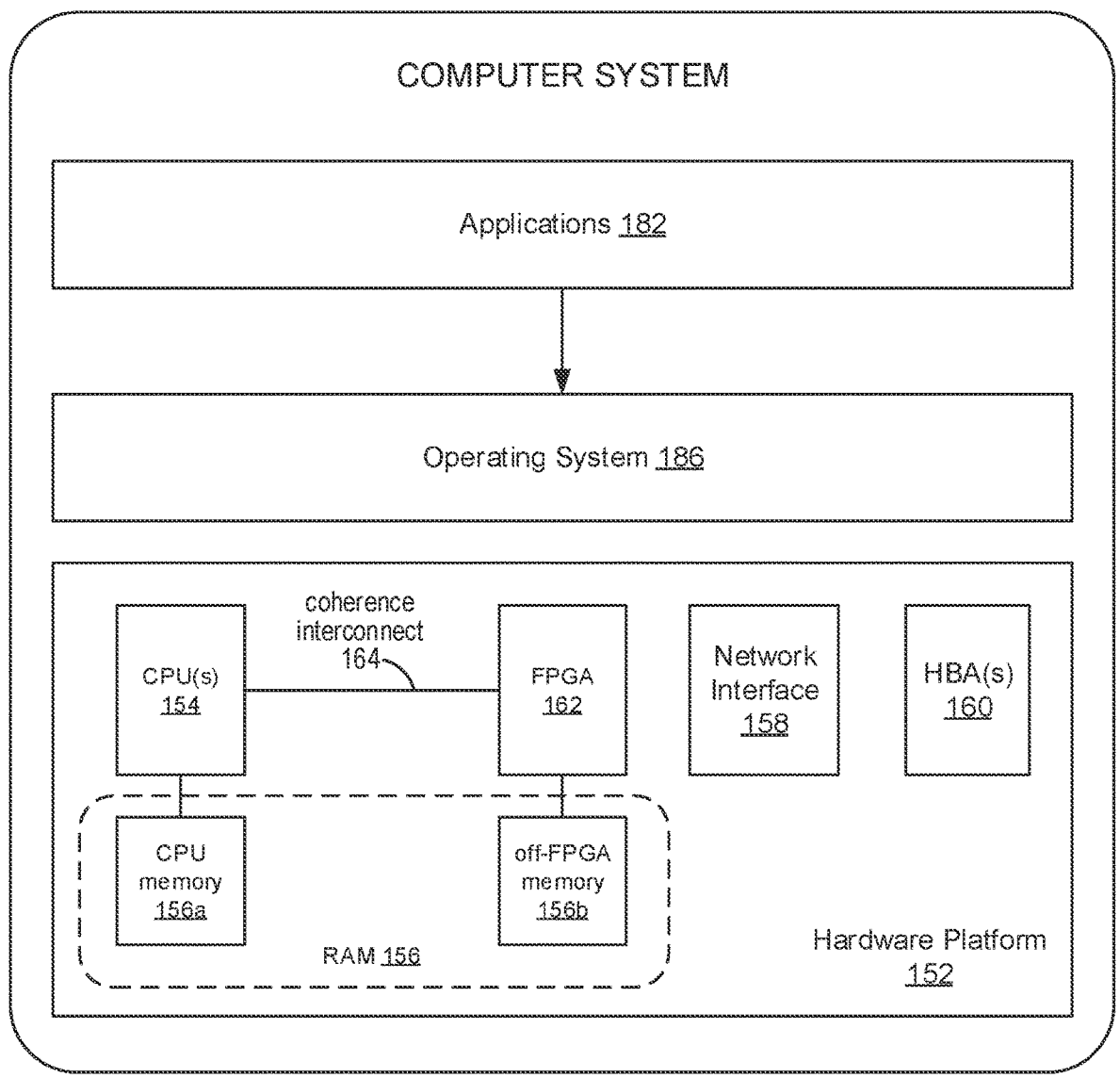
FIG. 1B depicts a block diagram of a computer system that is representative of a non-virtualized computer architecture in which embodiments may be implemented.

FIG. 1B is a block diagram of a computer system that is representative of an alternative computer architecture in which embodiments may be implemented. As illustrated, computer system 150 includes a hardware platform 152 that is similar to hardware platform 102. Hardware platform 152 includes conventional computer hardware components, such as one or more items of processing hardware including central processing units (CPUs) 154, random access memory (RAM) 156 as system memory, one or more network interfaces 158 for connecting to a network, and one or more host bus adapters (HBA) 160 for connecting to a storage system. In addition, hardware platform 152 includes an FPGA 162, which is installed in a CPU socket and communicates with one or more CPUs 154 via coherence interconnect 164. Coherence interconnect 164 may be any point-to-point coherence interconnect between processors such as those identified above for coherence interconnect 114. Though the following description has the FPGA occupying a CPU socket, the embodiments are not so limited; any arrangement of the FPGA that includes a connection to the coherence interconnect among processors present in computer system 150 is sufficient. Hardware platform 152 supports the installation of an operating system 186, on top of which applications 182 are executed in computer system 150. Examples of an operating system 186 include any of the well-known commodity operating systems, such as the Microsoft Windows® operating system, the Linux® operating system, and the like.

Figure 2:
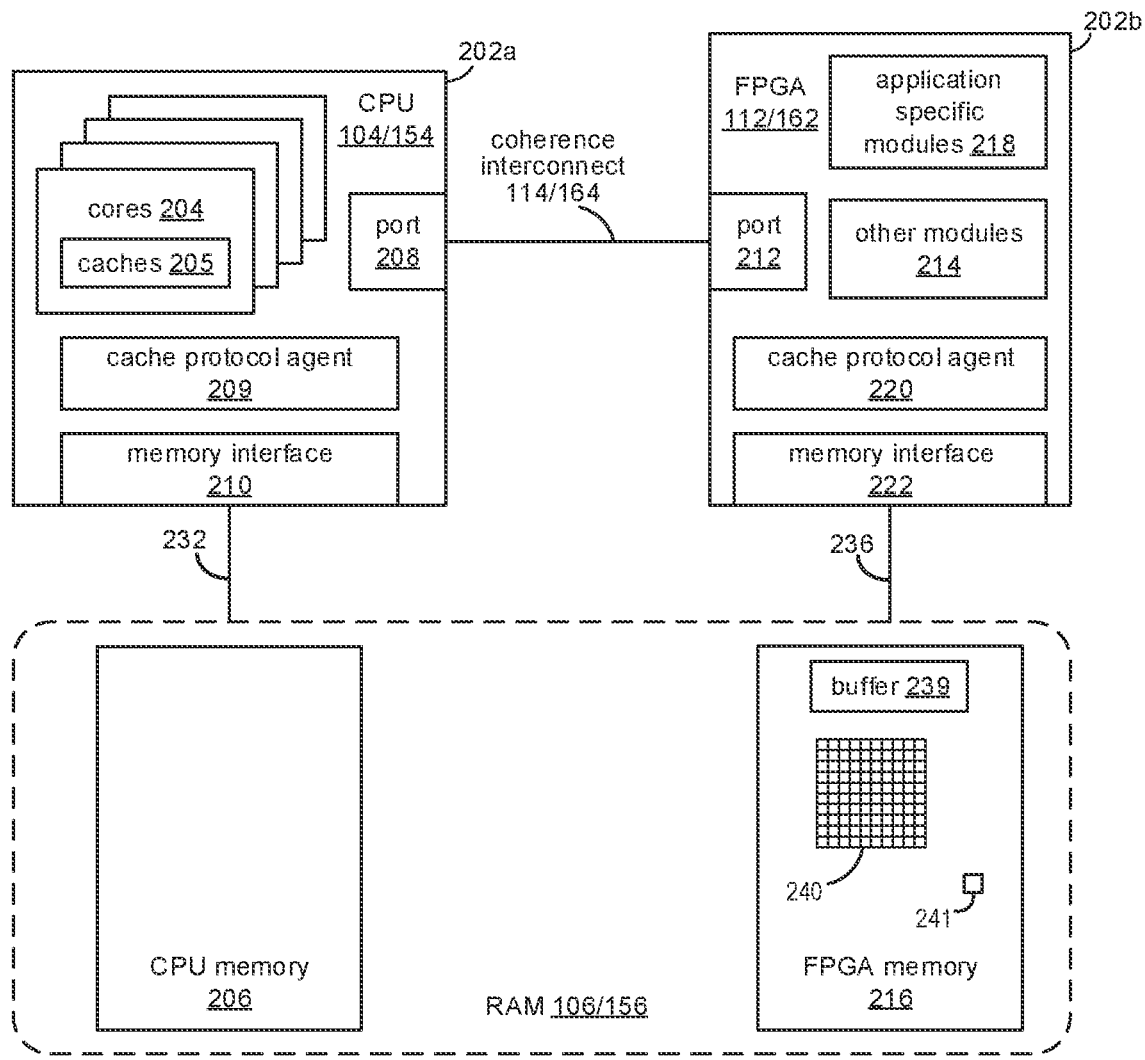
FIG. 2 depicts a block diagram of a pair of CPU sockets for a CPU and an FPGA, in an embodiment.

FIG. 2 depicts a block diagram of a pair of CPU sockets, a first socket 202a for a representative one of CPUs 104 (or CPUs 154), and a second socket 202b for an FPGA (e.g., FPGA 112 or FPGA 162). The CPU includes one or more processing cores 204, caches 205 for processing cores 204 (often implemented as a hierarchy of multiple cache levels), a cache protocol agent 209 for enforcing the cache coherence protocol, a communications port 208 connected to a coherence interconnect (e.g., coherence interconnect 114 or coherence interconnect 164), and a memory interface 210 connected via memory bus 232 to CPU memory 206, which is allocated from RAM 106 or RAM 156. The FPGA is configured with one or more application-specific modules 218, a cache protocol agent 220 for enforcing the cache coherence protocol, a communications port 212 connected to coherence interconnect 114, 164, and a memory interface 222 connected via memory bus 236 to FPGA memory 216, which is allocated from RAM 106 or RAM 156. Other modules 214, whose operations are unrelated to application-specific modules 218, also may be configured in FPGA 112. In one embodiment, each CPU socket, 202a, 202b, represents a separate Non-Uniform Memory Access (NUMA) domain.

As is well known, caches 205 are used to reduce the average cost to access data from memory. Data is transferred between CPU memory 206 and caches 205 in blocks of fixed size, called cache lines or cache blocks. When a cache line is copied from CPU memory 206 into caches 205, a cache entry is created, which includes both the copied data and the requested memory location (called a tag). When the CPU requests to read or write a location in CPU memory 206, caches 205 first check for a corresponding entry contained therein. That is, caches 205 search for the contents of the requested memory location in any cache lines that might contain that address. If the CPU finds that the memory location resides in caches 205, a cache hit has occurred, and the CPU immediately reads or writes the data in the cache line. However, if the CPU does not find the memory location in caches 205, a cache miss has occurred. For a cache miss, caches 205 allocate a new entry and copy data from CPU memory 206. The request is then fulfilled from the contents of caches 205.

Communication ports 208, 212, mentioned above, support a coherence protocol, which is designed to maintain cache coherence in a system with many processors, each having its own cache or caches. With the FPGA residing in one socket 202b of the CPU sockets and having its own communication port 212 that supports the coherence protocol, the FPGA can monitor and participate in the coherency protocol that keeps the processor caches coherent.

Cache coherence on the coherence interconnect is maintained according to a standard coherence protocol, such as modified, exclusive, shared, invalid (MESI) protocol or modified, exclusive, shared, invalid, forwarded (MESIF) protocol. In these protocols, cache lines marked invalid signify that the cache line has invalid data, and fresh data must be brought into caches 205 from CPU memory 206. Cache lines marked exclusive, shared, and forwarded (in the MESIF protocol) all signify that the cache line has valid data, but the cache line is clean (not modified), so the cache line can be discarded from the cache without writing data of the cache line back to CPU memory 206. A cache line marked as modified signifies the cache line is modified or dirty, and data of the cache line must be written back to CPU memory 206 before the cache line is discarded from caches 205.

Each cache protocol agent can initiate and respond to transactions on the coherence interconnect by sending and receiving messages on the coherence interconnect. In the embodiments illustrated herein, cache protocol agent 209 cooperates with cache protocol agent 220 by sending messages, including broadcast messages, over the coherence interconnect. In the protocol, one of the cache protocol agents is an owner of a set of cache lines and contains information regarding those cache lines. The other cache protocol agents send messages to the owner agent requesting a cache line or to find the status of the cache line owned by the owner agent. The owner agent may service the request directly or request that another cache protocol agent satisfy the request.

When the CPU accesses a cache line that is not in its caches 205, at any level of the cache hierarchy, it is cache protocol agent 209 of the CPU that requests the cache line from CPU memory 206. Thus, cache protocol agent 209 in CPU 104 issues a load cache line transaction on coherence interconnect 114. The transaction can be 'Load Shared' for sharing the cache line or 'Load Exclusive' for cache lines that will be modified. A cache line that is loaded as 'Shared' means that the line probably will not be modified. In contrast, a cache line that is loaded as 'Exclusive' is considered potentially dirty because it is not certain the cache line will be modified. When a cache line gets evicted from caches 205 to CPU memory 206, if it is modified, it must be written back to CPU memory 206 from which it originated. The operation of writing the cache line is performed on coherence interconnect 114 as a write-back transaction and can be monitored for tracking dirty cache lines. In the case of a write-back transaction, the cache line is actually dirty rather than potentially dirty. In the description that follows, a writeback transaction is converted to and handled as a message, 'WB_Data CL.'

To confirm whether a cache line is dirty or not, a cache protocol agent, such as cache protocol agent 220 in the FPGA, can snoop the cache line in accordance with the coherence interconnect protocol. If the cache line is dirty, the snoop triggers a write-back transaction, thereby exposing the dirty cache line that was residing in the processor cache. Cache protocol agents 209 and 220 also have information regarding the cache lines that are resident in the processor caches. This information is accessible via coherence interconnect 114.

Embodiments employ the FPGA to track accesses to code pages of an operating system kernel, and to perform real-time updates on the kernel code. To enable to FPGA to carry out these tasks, buffer 239 is configured in FPGA memory 216 for storing cache lines of code pages that are accessed. In addition, code pages 240 of the operating system kernel are stored in FPGA memory 216 prior to booting of the operating system (e.g., by boot code when virtual machine 118 or computer system 150 powers on) and the operating system is booted from FPGA memory 216. Also stored in FPGA memory 216 is patch code 241. The operating system kernel may be the kernel of guest OS 130 or the kernel of OS 186. In both cases, real-time updates may be performed on the kernel code to patch security vulnerabilities and to inject code for purposes of tracing. In the case where the operating system kernel is the kernel of guest OS 130, an additional use case is injecting code on the fly to communicate various states of virtual machine 118 to hypervisor 111.

Figure 3:
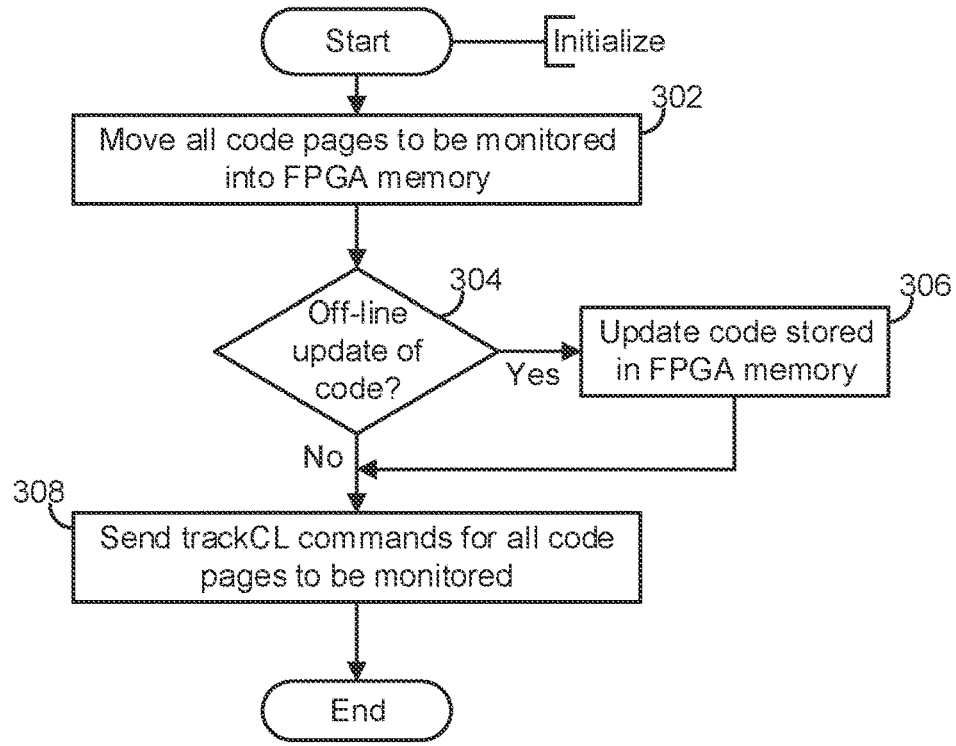
FIG. 3 depicts a flow of operations for an initialize function.

FIG. 3 depicts a flow of operations of an initialize function that is carried out by a boot code that is executed when virtual machine 118 or computer system 150 powers on. In step 302, all code pages of the operating system kernel are moved into FPGA memory 216. Then, in step 304, the boot code determines whether or not there are any updates to the code pages. If there are (step 304; Yes), the boot code in step 306 updates the code pages stored in FPGA memory 216 and in step 308 sends trackCL commands on the coherence interconnect to begin tracking the code pages. In response to these trackCL commands, a dataCL module, as described below in conjunction with FIG. 4, begins tracking the code pages. If there are no updates to the code pages (step 304; No), step 306 is skipped and step 308 is executed in the manner described above.

Figure 4:
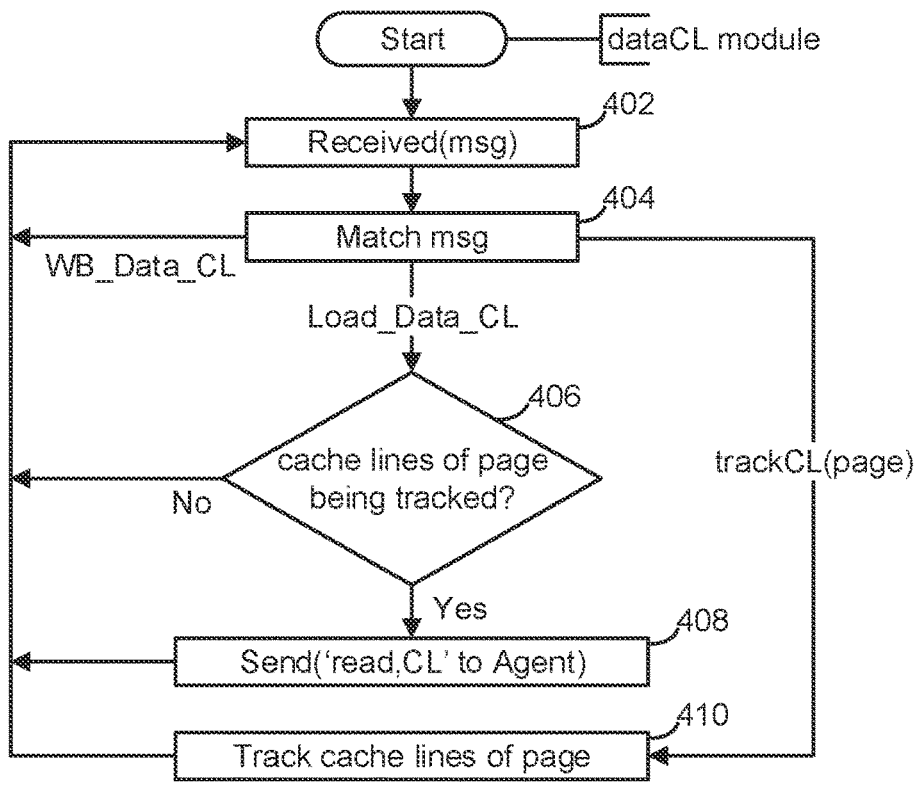
FIG. 4 depicts a flow of operations of a module that listens to activity on a coherence interconnect.

FIG. 4 depicts a flow of operations of the dataCL module that listens to activity on a coherence interconnect. In one embodiment, the dataCL module is one of application-specific modules 218. In step 402, the module receives a message and, in step 404, matches the message to one of two events on the coherence interconnect or to a message sent from other functions. If the message is a trackCL command, then the module is configured in step 410 to begin tracking accesses to the cache lines of the page specified in the command. If the message is a 'Load_Data_CL' from the coherence interconnect, the module determines in step 406 whether the cache line resides in any one of the pages being tracked, as requested by trackCL commands. If so, in step 408, the module sends a message including the cache line address and data to cache protocol agent 220 for further handling as described below in conjunction with FIG. 5. If the message is a 'WB_Data_CL' from the coherence interconnect or the cache line in the 'Load_Data_CL' message does not reside in any one of the pages being tracked, the module returns to step 402 and wait for receipt another message on the coherence interconnect.

Figure 5:
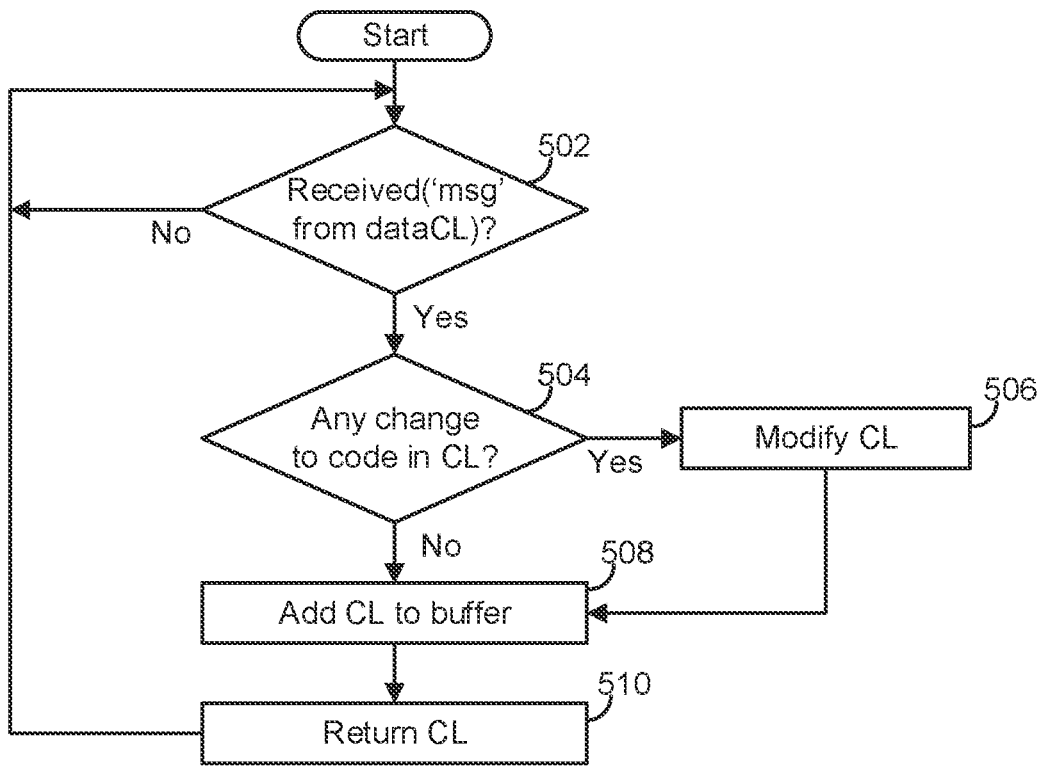
FIG. 5 depicts a flow of operations carried out by a cache protocol agent in the FPGA to track cache line accesses to code pages and perform real-time updates to the code according to embodiments.

Cache protocol agent 220 executes the steps illustrated in FIG. 5 in response to the message received from the dataCL module to track cache line accesses to code pages of the operating system kernel and perform real-time updates to the code if the cache line accessed contains the portion of the code with an update. The agent awaits the receipt of the message in step 502. If the message is received, the agent performs a check in step 504 to determine if the cache line is subject to a real-time update. Examples of a real-time update include adding instructions to jump or trap to a patch code (e.g., execute a trampoline to patch code 241 that accelerates the code or repairs a security vulnerability), or instructions to flush a cache line for purposes of tracing the execution path of the kernel code and in some cases to provide hints about the guest operating system to the hypervisor in a para-virtualized setting. If the cache line is subject to the real-time update (step 504; Yes), the cache line is modified accordingly in step 506. Then, the modified cache line is added to buffer 239 in step 508 and returned to the requestor in step 510. As a result, instead of the cache line read from code pages 240, the modified cache line is returned to the requestor.

On the other hand, if the cache line is not subject to a real-time update (step 504; No), step 506 is skipped and the cache line read from code pages 240 is not modified. Thus, the cache line read from code pages 240 is added to buffer 239 in step 508 and returned to the requestor in step 510. The process returns to step 502 after step 510.

Figure 6:
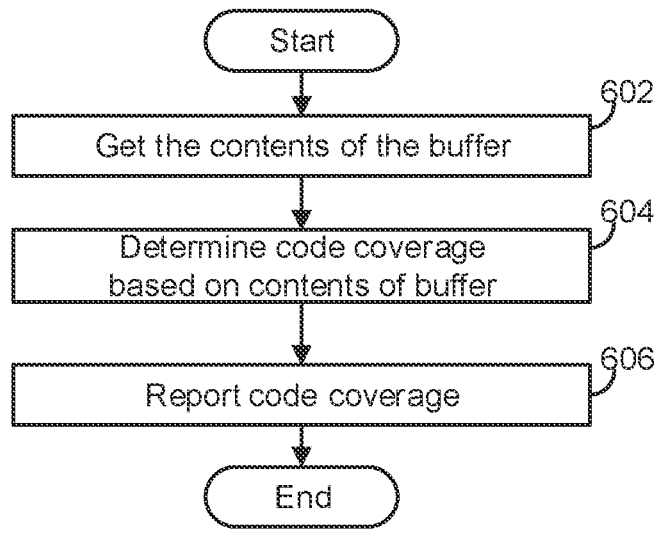
FIG. 6 depicts a flow of operations executed by one of application-specific modules in the FPGA to determine code coverage.

FIG. 6 depicts a flow of operations executed by one of application-specific modules 218 to determine code coverage, for example, when a user launches a code profiling tool. The module in step 602 obtains the contents of buffer 239, and in step 604 determines code coverage of the operating system kernel from cache lines that have been accessed and recorded in buffer 239. In step 606, the module reports the code coverage. Code coverage determined in in step 604 may be expressed in various forms known in the art to provide insight about the executing code. A high code coverage is an indicator of a well-written and testable code. Code coverage also provides information on any code execution paths that are missed and can help in dead code detection and elimination. In addition, frequency of accesses to a code page may be derived from code coverage. Frequency of accesses to different code pages may be provided as hints that can be employed during debugging, troubleshooting, and upgrading of the kernel code. In this manner, real-time information on the kernel code can be obtained by code profiling tools in a non-intrusive manner because the kernel code was not stopped or interrupted to obtain the data recorded in buffer 239.

In the embodiments described above, cache-line accesses to code pages of kernel code are tracked and cache lines that are subject to updates are modified in real-time, i.e., without stopping the execution of the kernel. Embodiments are not limited to the kernel code and may be practiced with other code executing on processors that are connected to FPGA via the coherence interconnect. For other types of code, the initialize function may be executed after booting of the operating system by, e.g., the kernel of the operating system.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of modifying a portion of code that is stored in code pages while the code is being executed in a processor, the method comprising:

prior to execution of the code by the processor, storing the code pages in a local memory of a device that is connected to the processor via a coherence interconnect; and during execution of the code by the processor, monitoring by the device the coherence interconnect for requests to access cache lines of the code pages, wherein, in response to a request to read a cache line of the code pages having a particular address, the device retrieves the cache line of the code pages having the particular address from the local memory, stores the cache line retrieved from the local memory in a buffer, modifies the cache line stored in the buffer, and transmits the modified cache line to the processor in place of the cache line retrieved from the local memory.

2. The method of claim 1, wherein contents of the modified cache line include a jump instruction to a patch code that is stored in the local memory of the device and contents of the cache line retrieved from the local memory do not.

3. The method of claim 1, wherein contents of the modified cache line include a cache flush instruction and contents of the cache line retrieved from the local memory do not.

4. The method of claim 1, further comprising:
recording each cache line of the code pages that has been accessed in the buffer.

5. The method of claim 1, wherein the code pages are code pages of an operating system kernel.

6. The method of claim 5, wherein the operating system kernel is executing within a virtual machine.

7. The method of claim 5, wherein the operating system kernel is executing within a physical machine.

8. A non-transitory computer-readable medium comprising instructions to be executed in a device which is connected to a processor via a coherence interconnect, wherein the processor executes code having code pages that are stored in a local memory of the device and the instructions when executed in the device causes the device to carry out a method of modifying a portion of the code, the method comprising:

during execution of the code by the processor, monitoring the coherence interconnect for requests to access cache lines of code pages that are stored in the local memory of the device, and in response to a request to read a cache line of the code pages having a particular address, retrieving the cache line of the code pages having the particular address from the local memory, storing the cache line retrieved from the local memory in a buffer, modifying the cache line stored in the buffer, and transmitting the modified cache line to the processor in place of the cache line retrieved from the local memory.

9. The non-transitory computer-readable medium of claim 8, wherein contents of the modified cache line include a jump instruction to a patch code that is stored in the local memory of the device and contents of the cache line retrieved from the local memory do not.

10. The non-transitory computer-readable medium of claim 8, wherein contents of the modified cache line include a cache flush instruction and contents of the cache line retrieved from the local memory do not.

11. The non-transitory computer-readable medium of claim 8, wherein the method further comprises:

recording each cache line of the code pages that has been accessed in the buffer.

12. The non-transitory computer-readable medium of claim 8, wherein the code pages are code pages of an operating system kernel.

13. The non-transitory computer-readable medium of claim 12, wherein the operating system kernel is executing within a virtual machine.

14. The non-transitory computer-readable medium of claim 12, wherein the operating system kernel is executing within a physical machine.

15. A computer system comprising
a processor;
a device connected to the processor via a coherence interconnect, the device including local memory in which code pages of code to be executed in the processor are stored, wherein the device is configured to:
during execution of the code by the processor, monitoring the coherence interconnect for requests to access cache lines of the code pages, and in response to a request to read a cache line of the code pages having a particular address, retrieving the cache line of the code pages having the particular address from the local memory, storing the cache line retrieved from the local memory in a buffer, modifying the cache line stored in the buffer, and transmitting the modified cache line to the processor in place of the cache line retrieved from the local memory.

16. The computer system of claim 15, wherein contents of the modified cache line include a jump instruction to a patch code that is stored in the local memory of the device and contents of the cache line retrieved from the local memory do not.

17. The computer system of claim 15, wherein contents of the modified cache line include a cache flush instruction and contents of the cache line retrieved from the local memory do not.

18. The computer system of claim 15, wherein the device is further configured to:
record each cache line of the code pages that has been accessed in the buffer.

19. The computer system of claim 15, wherein the code pages are code pages of an operating system kernel.

20. The computer system of claim 19, wherein the operating system kernel is executing within a virtual machine or a physical machine.

* * * * *